United States Patent [19]

Horvat

[11] Patent Number: 4,669,710

[45] Date of Patent: Jun. 2, 1987

[54] PNEUMATIC SUSPENSION SYSTEM

[75] Inventor: Borut Horvat, Maribor, Yugoslavia

[73] Assignee: Firma Carl Freudenberg, Weiheim-Bergstr., Fed. Rep. of Germany

[21] Appl. No.: 629,366

[22] Filed: Jul. 10, 1984

[30] Foreign Application Priority Data

Aug. 13, 1983 [DE] Fed. Rep. of Germany ....... 3329327

[51] Int. Cl.$^4$ ............................. F16F 9/04; F16F 9/34
[52] U.S. Cl. .................................. 267/64.21; 137/38; 137/596.18; 248/550; 248/562; 267/64.24; 267/122; 280/714
[58] Field of Search ............... 267/140.1, 64.21, 64.24, 267/64.16, 64.15, 64.17, 64.19, 64.23, 64.26, 126, 122, 134, DIG. 1-3; 188/378, 322.15, 282, 275, 1.11; 280/714, 711, DIG. 1; 91/454; 137/102, 596.18, 627.5, 38, 39, 596.15; 248/550, 562, 566, 636

[56] References Cited

U.S. PATENT DOCUMENTS

| | | | |
|---|---|---|---|
| 2,893,415 | 7/1959 | Arenhold et al. | 137/102 X |
| 2,934,175 | 4/1960 | Schnitzer | 188/1.11 X |
| 2,965,372 | 12/1960 | Cavanaugh | 267/126 |
| 2,977,134 | 3/1961 | Helling | 267/64.21 X |
| 3,026,103 | 3/1962 | Gates | 280/714 X |
| 3,070,108 | 12/1962 | Fischer | 137/102 |
| 3,181,854 | 5/1965 | Backlund | 280/714 X |
| 3,730,473 | 5/1973 | Pepi | 267/122 X |
| 3,989,232 | 11/1976 | Steinbach et al. | 267/122 X |
| 4,077,617 | 3/1978 | Wright | 280/714 X |
| 4,291,717 | 9/1981 | Orcutt | 137/627.5 X |
| 4,468,739 | 8/1984 | Woods et al. | 280/714 X |

FOREIGN PATENT DOCUMENTS 1582333  1/1981  United Kingdom ............... 280/714

Primary Examiner—Andres Kashnikow
Assistant Examiner—Richard R. Diefendorf
Attorney, Agent, or Firm—Felfe & Lynch

[57] ABSTRACT

A pneumatic suspension system between relatively-vibratable structures has a single expansible pneumatic working chamber for pneumatically isolating the vibrations between the structures and inlet and outlet valves responsive to a control for opening only one at a time in response to vibrations which exceed respective vibration thresholds. The valves then admit or vent gas from the working chamber to damp vibrations in the threshold-determined range which includes resonance.

16 Claims, 4 Drawing Figures

PNEUMATIC SUSPENSION SYSTEM

BACKGROUND OF THE INVENTION

The invention relates to an active pneumatic suspension system for relatively-vibratable structures.

A pneumatic suspension system is known from U.S. Pat. No. 2,965,372. There, a piston forms a compliant boundary wall between two chambers. The piston is secured to one relatively-vibrating structure to reciprocate in a cylinder secured to the other. The piston is acted upon on one side by pressurized gas having a mean pressure and, when displaced by relative vibration, actuates a valve to adjust the gas pressure acting across the piston. The resulting pressure difference returns the piston to an intermediate position. The two, cooperating working spaces on the opposite sides of the piston and the associated control make the manufacturing cost of this apparatus high and, thus, the apparatus has not gained wide acceptance.

SUMMARY OF THE INVENTION

The object of the invention is, therefore, to improve an actively-controlled pneumatic suspension system in such a way that it can be produced more cheaply, yet will effectively isolate higher-frequency vibrations and effectively damp lower-frequency vibrations, especially in the range about the resonance frequency of the structures and system.

To these and other ends, and in contrast to the pneumatic suspension system of U.S. Pat. No. 2,965,372, the pneumatic suspension system of the invention has a housing with only one working chamber. The chamber is filled with a gas at a mean, above-atmosphere pressure to constitute the actual suspension arrangement between relatively-vibratable structures, such suspension including horizontal connection as well as vertical support. The working space can therefore be of simple, expansible design sealed at one end by a rubber bellows, for example.

The active control elements are advantageously combined in a main control unit. It has a valve combination for admitting and exhausting the gas from the chamber. Gas of a pressure exceeding the mean pressure is fed to the admission (inlet) valve either from a compressor or from an accumulator and preferably via a pressure controller. The exhaust (outlet) valve opens to atmosphere. The inlet and outlet valves are arranged so that only one can be open at any one time and, preferably, so that both are normally closed.

A change in the closed condition of the valve combination occurs when the dynamic loading of the pneumatic suspension system, i.e. the relative vibrations between the structures exceeds preset thresholds. For this, in one embodiment, the valves respond to the difference between the instantaneous pressure in the working chamber of the housing and in a damping chamber of the control unit which communicates with the working chamber space through a throttle opening exceeding a given minimum. Sufficient dynamic inward displacement of the vibrating structures toward each other in amplitude and time increases the pressure in the working chamber above the threshold difference to open the outlet valve to vent the working chamber to atmosphere until the pressure difference is reduced below the threshold from venting gas from the working chamber and throttling gas into the damping chamber. Sufficient, opposite, outward displacement of the structures away from each other opens the inlet valve after the opposite pressure difference exceeds its threshold until pressure equalization is brought about.

The damping effect so obtained damps vibrations in the resonance-frequency range of the suspended, relatively-vibrating structures and system because these are large, and thus considered extremely troublesome, but will therefore produce pressure differences exceeding the thresholds in sufficient time. The resonance-frequency range over which good damping is desired usually extends from more than 0 Hz to about 1.5 times the natural frequency of the suspended structures and system.

Vibrations farther above the resonance-frequency range, however, practically have amplitudes merely producing pressure differences which are insufficient to actuate the valves. The valves therefore stay closed, and good pneumatic vibration-isolation between the supported structures is thus obtained.

It is also possible to use the acceleration between the suspended structures directly as the controlling variable. For this, in another, inertial embodiment, all that is needed is a floating member which is movable in a direction parallel to that of the vibrations with a natural frequency above that of the suspended system. The floating member or members are connected to the valves in such a way that relative acceleration of the structures away from each other, in the outward direction, opens the gas inlet valve and opposite acceleration, in the inward direction, opens the gas outlet valve, such accelerations below threshold levels not actuating the valves. The floating member is advantageously secured directly to the valve. Indeed, the floating member may be a component of the valve, for example, the valve seat or the valve stem if provision is made for axial displacement which exceeds the desired threshold level to produce the valve opening.

The inlet and outlet valves may be operatively coupled in either embodiment and, starting from the mutually-closed, normal position, alternatively opened. Thus, in the normal position, no pressurized gas is consumed.

The function of the control thus is to open and close the valves via sufficient pressure differences or accelerations which, in both cases, will include the large amplitude vibrations of the resonance-frequency range of the structures and system. Depending on the direction of the vibration, the inlet or outlet valve admits additional pressurized gas into the housing or exhausts gas from it. This dynamic variation of the volume of gas confined in the housing at a given moment reduces the dynamic component of the internal pressure of the housing which results in damping the pneumatic resilience of the suspension system and connected structures. The damping action is highly advantageous, especially over the range of the natural frequency of the vibrating system formed by the pneumatic suspension and the mass of the structures, including the housing, while at higher frequencies of vibration, the good vibration-isolating properties of the air spring alone is utilized. Each structure is thus substantially isolated with respect to vibrations from the other. Vibrations introduced through the structures thus will not have an adverse effect on the operating reliability and service life of the control.

For obtaining identical flow characteristics for both the inlet and outlet valves regardless of the gas supply pressure or the mass of one of the structures resiliently supported on the other, it has been found advisable to provide a pressure controller ahead of the gas inlet valve of the control unit. In one embodiment, it is controlled by a control piston bounding a measuring chamber which communicates with the working chamber enclosed by the housing through a throttle. The throttle opening may have a variable cross-sectional area, which will permit variation of the speed of response. The pressure reduction ratio of the pressure controller from a gas supply to the control unit may range from about 0.1 to about 0.9, and advantageously from 0.3 to 0.8. In an embodiment which has proved particularly practical, it is about 0.5.

In addition to the control and pressure controller described above for controlling the working gas pressure in the housing, the pneumatic suspension system of the invention may also have a level controller to set a basic level or spacing, not considering the instantaneous loading of vibrations, of one structure resiliently supported on the other with the system. It may be merely an arrangement for setting the mean pressure in the housing. The presence of such a level controller will not affect the operation of the pneumatic suspension in any way.

Several advantages are obtained with the pneumatic suspension system of the invention. It permits significantly better suppression of vibrations than can be obtained with passive systems. Electronic control is not required. The suspension therefore is not prone to malfunctions due to moisture, power-supply failures, or electrical or mechanical shocks. Power consumption is low because the control system, designed as a frequency filter, need actually require power only in the resonance-frequency range. At higher frequencies, the absence of damping action results in good vibration isolation, whereas at very low frequencies, under 0.5 Hz, for example, the structures can follow the movements of each other which, in the case of a motor vehicle, for example, is not considered a nuisance. Because of these properties, and because the pneumatic suspension system of the invention can be manufactured at low cost, it is well suited for use in automotive vehicles, in the rolling stock of railroads, and in machinery generally. In these applications, the pneumatic suspension system of the invention can be depended on to react effectively and with adequate speed to vibrations and, particularly, to nonperiodic vibrations.

BRIEF DESCRIPTION OF THE DRAWINGS

Preferred embodiments which are intended to illustrate but not to limit the invention will now be described in greater detail with reference to the accompanying drawings, wherein.

DETAILED DESCRIPTION OF THE INVENTION

Figure 1:
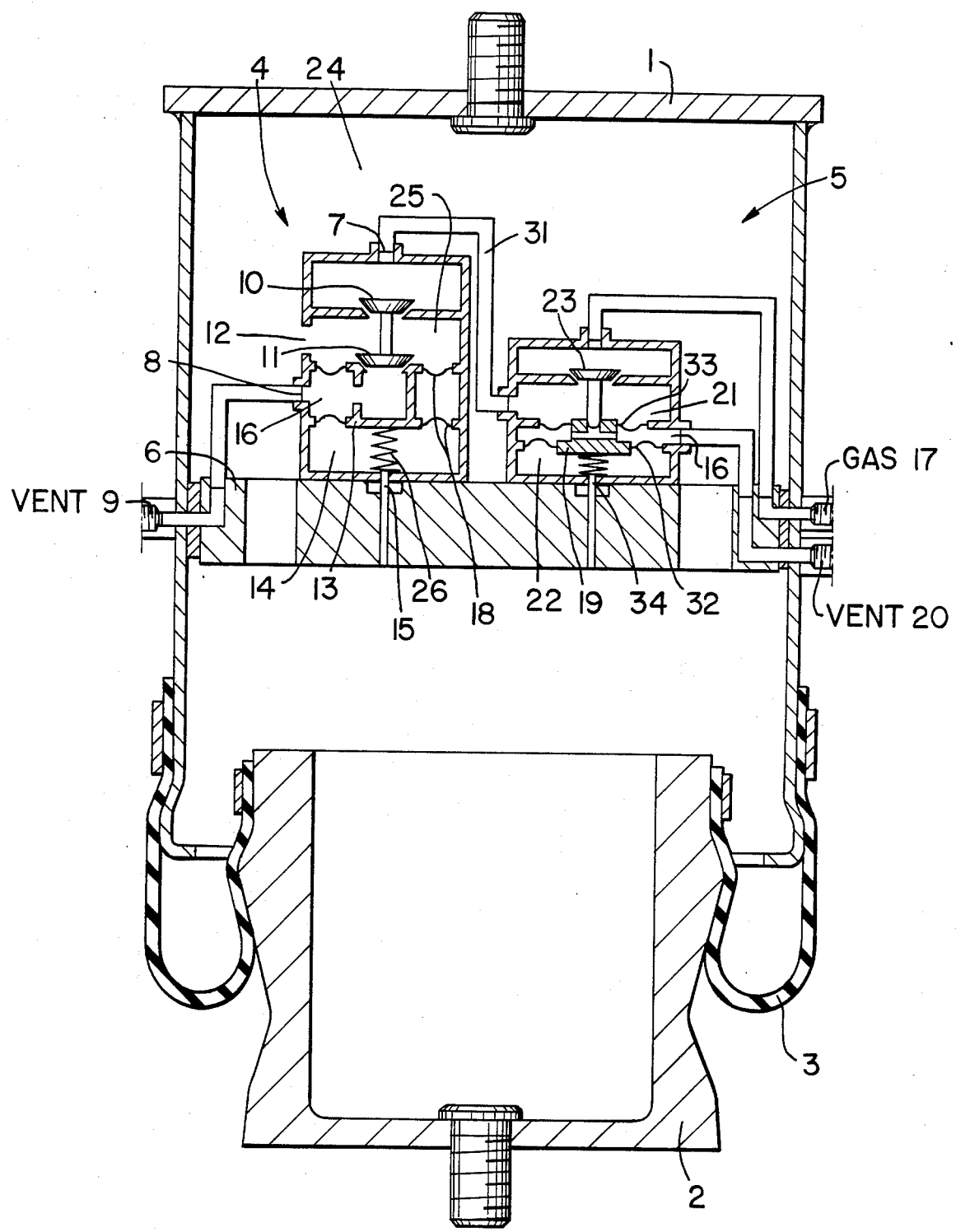
FIG. 1 is a cross-sectional elevation of one preferred embodiment.

The pneumatic suspension shown in FIG. 1 has a housing 1. The housing is a steel pipe closed by a lid at one, top end. A vertical threaded stud projects from the center of the lid for rigidly fastening the housing to one structure (not shown), for example, the cab of a truck.

A boundary wall which is movable in the direction of vibrations of the structure relative to another closes the other end of the housing. It is formed by a cast-steel plug 2 having rotational symmetry and a seal, for example, a rolling diaphragm 3, by which it is connected gas tight and axially movably to the housing 1. Another threaded stud projects from the center of the plug 2 for rigidly fastening it to the other structure which vibrates relative to the first under operating conditions, for example, the frame of a truck. The housing 1, including the plug 2 and diaphragm 3 thus enclose an interior space or working chamber 24 that is sealed gas tight.

The working chamber 24 contains a gas, for example compressed air, pressurized to a mean pressure above atmospheric pressure to act as an air spring suspension between the structures, modified by a controlled damping. Mounted on a pedestal 6 in the interior of the housing 1 are a control unit 4 and a pressure controller 5 for the damping. The control unit 4 has an inlet orifice 7 through which gas of a pressure above the mean pressure is admitted from the pressure controller 5 via a supply line 31 and an outlet orifice 8 which, through a line 9, vents to the atmosphere. This arrangement considerably simplifies installation. Embodiments in which the control unit and/or pressure controller are separate from the housing and connected therewith through a hose or pipe will have reduced dimensions, however, which may also facilitate installation.

In the control unit, inlet and outlet valves are formed by bevel plugs 10 and 11, respectively, which are rigidly interconnected through a common stem. The stem is disposed in an equalizing chamber 25 which communicates with the working chamber 24 through an equalizing opening 12 which does not restrict gas flow or pressure.

The valve seat for the inlet-valve bevel plug 10 is fixed in a housing for the control unit whereas the valve seat of the outlet-valve bevel plug 11 is in a doubly-suspended piston 13 which separates the equalizing chamber 25 from an opposite damping chamber 14. The damping chamber 14 communicates with the working chamber 24 through a throttle opening 15. The double suspension for the piston 13 itself encloses a relief space 16 which communicates with the atmosphere through the gas outlet orifice 8 and is sealed from the equalizing and damping chambers by a pair of soft, flexible, spacedly-superposed diaphragms 18 forming the double piston suspension to the control housing. A threshold-setting spring 26 also connects the suspended piston 15 to the control housing for spring extension in the direction of the piston suspension.

The principle of operation of the control unit 4 with large-amplitude relative vibrations between the structures at sufficient frequency, as in the resonance-frequency range, is as follows:

With pronounced, sufficiently-rapid inward displacement of casting 2, as is typical in the case of resonance, the pressure rises in the working chamber 24 and in the equalizing space 25 of the control unit 4. The pressure also rises in the damping space 14, but with considerable delay due to the small diameter of the throttle opening 15, with the result that, after the force of threshold-setting spring 26 has been overcome, downward movement of the suspended piston 13 occurs. This downward movement opens the outlet valve by separating the suspended piston seat from bevel plug 11 and, hence, reduces the volume and thus the pressure of the gas in the working and equalizing chambers by venting through the gas outlet orifice 8. This reduction continues until the pressures acting on the suspended piston 13 from the equalizing and damping chambers are operatively equalized, allowing for spring 26. In this operating condition, the inlet and outlet valves are again closed.

Similar, but outward displacement of casting 2 produces a spontaneous pressure drop in the working and equalizing chambers. In this case, too, however, adjustment of the pressure in the damping chamber 14 is considerably delayed due to the small cross-sectional area of the throttle opening 15, with the result that, after the opposite force of the spring 26 has been overcome, the initially-higher pressure in the damping chamber 14 produces an upward movement of the suspended piston 13 and thus the outlet-valve bevel plug 11, stem, and the bevel plug 10 of the inlet valve. The latter therefore is now open and allows pressurized gas to flow through the equalizing chamber into the working chamber until the forces acting on the suspended piston 13 from both sides are equalized. The inlet and outlet valves then again close.

High-frequency vibrations generally have smaller amplitudes to produce only small, below-threshold pressure changes in the working chamber 24 which are insufficient to actuate the valves. Lower, below-resonance frequency vibrations generally have such long periods that the delay of throttle opening 15 becomes insignificant and the valves are likewise unactuated.

Like the control unit 4, the pressure controller 5 is also disposed on the pedestal 6. A compressed gas connection 17 is connected through a pipe to the pressure controller 5 and, through an antechamber 21 and the further pipe 31, to the gas inlet orifice of the control unit 4. A control piston 19 in combination with spacedly-superposed rolling diaphragms 32 and 33 which join it on opposite sides enclose a relief space 16 which, through a pipe, is connected to a vent opening 20. The stem of a bevel plug 23 slides in a passage in the piston 19 from antechamber 21 into the relief space 16. The bevel plug 23 seats in the pressure controller to form a valve for the gas connection 17. The control piston 19 and the two diaphragms 32 and 33 separate the antechamber 21 from an opposite control chamber 22 which communicates with the working chamber through a throttle opening 34. The ratio between the piston face directed toward the antechamber 21 and the piston face directed toward the control chamber 22 is 0.5. The mean pressure in the working chamber 24 thus bears a corresponding relationship to the pressure at the inlet valve of the control unit 4, which is a great advantage in securing equally-good responsiveness, both positively and negatively, for adjustment of the instantaneous pressure to the mean pressure in the working chamber and results in automatic adjustment of the pneumatic suspension system to varying masses of one structure supported on the other and gas supply pressures at connection 17.

Figure 2:
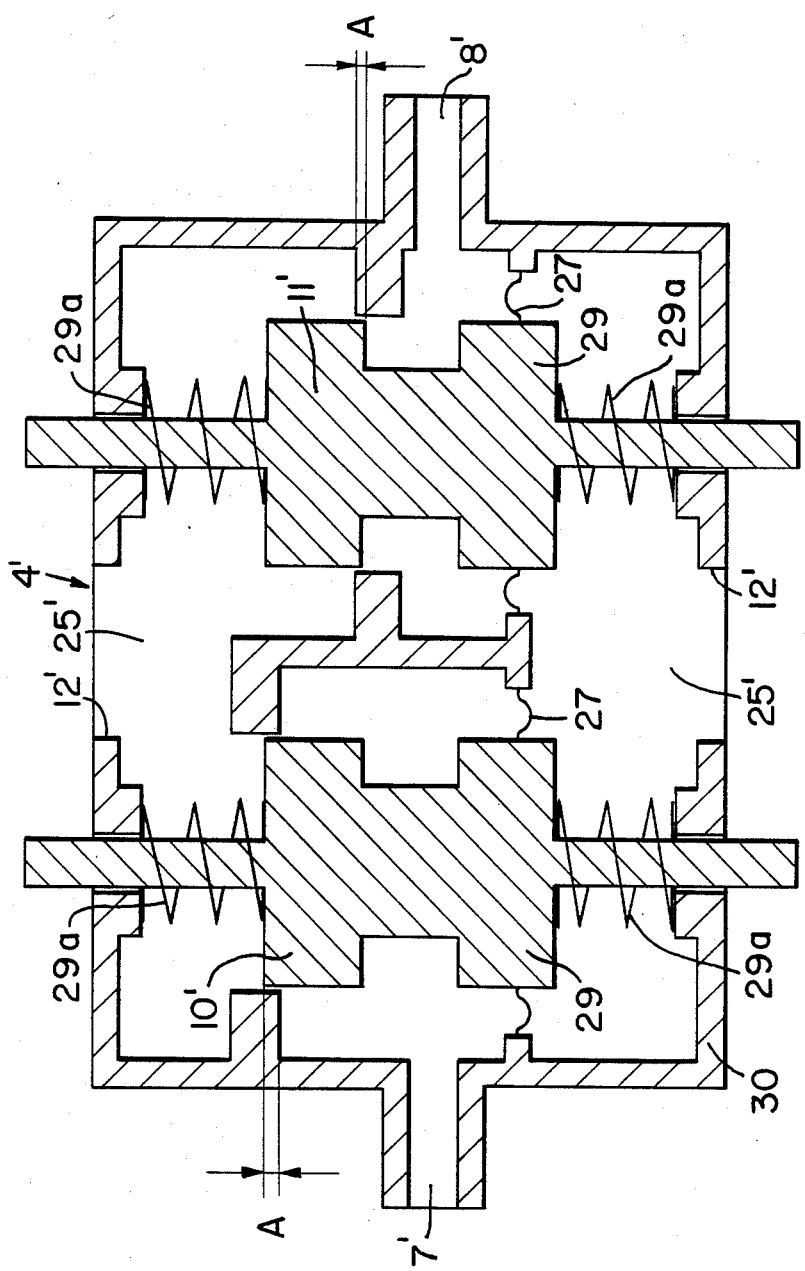
FIG. 2 is a cross-sectional elevation of a control unit portion of another embodiment.

FIG. 2 shows another inlet plug 10' and outlet plug 11' which are not connected to each other for valves disposed side by side. Both are formed by floating pistons 29 for inertial vibration response rather than pressure response. They are thus mounted for axial, vibration-parallel displacement by resilient support on a housing 30 of the control unit 4' through springs 29a.

The natural frequency of the piston and spring system is above that of the structures and suspension system.

The floating pistons 29 are sealed relative to the housing 30 with rolling diaphragms 27. The inlet valve plug 10' seats in the housing 30 at one end between the gas inlet orifice 7' and the equalizing chamber 25', and the outlet valve plug 11' seats in the housing 30 effectively at the other end formed by a notch in the piston between the outlet orifice 8' and the equalizing chamber 25. The plugs 10', 11' are axially movable in their seats in housing 30 to close the inlet and outlet orifices, respectively, without abutting. In the normal position shown, they overlap their valve seats in the direction of motion by a threshold dimension "A" which is proportional to a threshold force through the inertial suspension of pistons 29 on springs 29a. The dimension "A" which need not be the same, as shown, for each valve is greater than the amplitude of the high-frequency vibrations which are not to be damped. The time constant of the spring and piston system is shorter than the period of below-resonance vibrations. Such vibrations therefore will not actuate the valves. Actuation is limited to the resonance-frequency range. The relative motions of the floating pistons then are greater than the threshold dimension "A".

Operation within the resonance-frequency range is as follows:

The housing 30 of the control unit 4' is rigidly secured to a vibratable one of the structures through the housing (1 in FIG. 1) of the air spring, for example being part thereof, to follow every movement thereof.

With inward (downward in FIG. 2) displacement of the structure and control housing 30, the outlet valve plug 11' inertially opens and the gas is exhausted to the atmosphere from the working chamber through the equalizing chamber 25' and valve path to vent 8'. With opposite outward displacement, the inlet valve 10' opens to inlet 7' while the outlet valve plug 11' remains seated and closed. The pneumatic effect on the plugs 10', 11' through diaphragms 27 augment the operations described. There is no disturbing, valve-operation introduction of vibrations, and the control unit 4' operates noiselessly.

Figure 3:
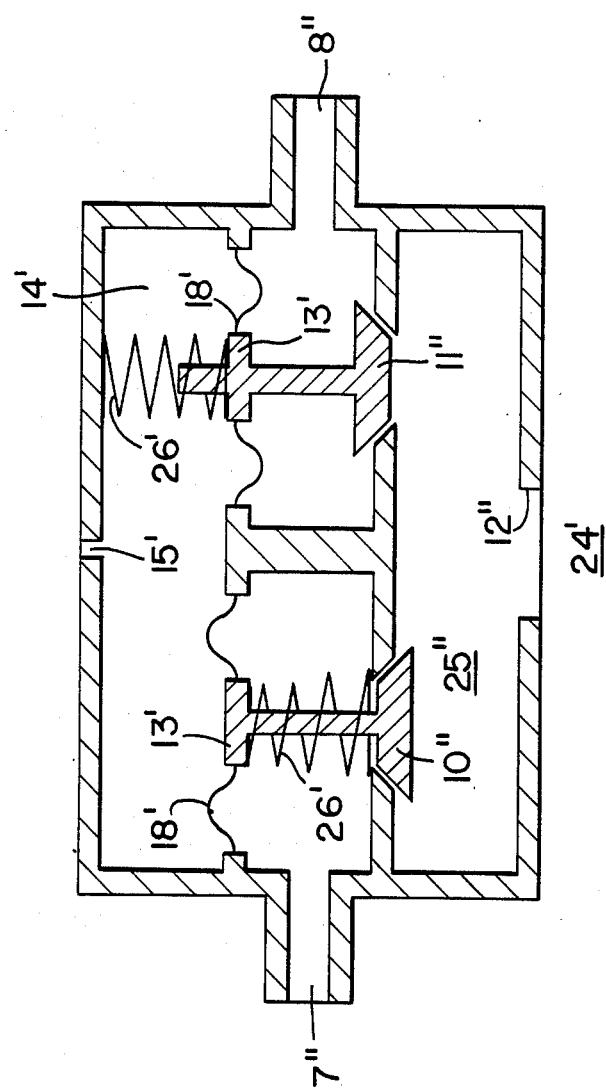
FIG. 3 is a cross-sectional elevation of a control unit portion of another embodiment.

Like the embodiment of the control unit shown in FIG. 2, that of FIG. 3 has inlet and outlet valves which are side-by-side and actuated independently of each other. As in FIG. 1, they are actuated by suspended pistons 13' which are supported and sealed through soft, flexible rolling diaphragms 18' relative to a damping chamber 14' which communicates with the working chamber 24' through a throttle opening 12'. The two valves open in opposite directions by corresponding arrangement of their respective bevel plugs 10", 11".

Operations within the resonance-frequency range is as follows:

Before a resonance-frequency vibration in this embodiment, too, both valves are closed, as an auxiliary function of the threshold-setting springs 26' in this embodiment. The pressure prevailing in the working chamber 24' acts directly on one side of the inlet and outlet valve plugs 10", 11" and, with the delay due to the throttle opening 15', on the suspended pistons 13' and their supporting diaphragms 18' and thus on the opposite sides of the valve plugs 10", 11".

With a sufficiently-rapid pressure rise in the opposite sides of the working chamber 24' which exceeds the force of the associated spring 26', the outlet valve plug 11" opens because the pressure which acts in the equalizing chamber 25" on that plug is initially greater than the throttled pressure acting back on the suspended piston 13' and the diaphragm 18'. The result unseats plug 11" and vents the working chamber through the outlet 8".

An opposite pressure drop in the working chamber 24' which exceeds the force of the associated spring 26' and the pressure of the gas in the damping space 14' because of the small diameter of the throttle opening 15' unseats the inlet valve plug 10'. The volume of gas then entering the working chamber through the inlet 7" rapidly readjusts the pressure level in the working chamber to the mean pressure. In this case, too, the pressure adjustment recloses the inlet valve. Renewed actuation of one of the two valves will occur only when the pressure in the working chamber again changes appropriately.

High-frequency vibrations are, practically, characterized by small amplitudes and, thus, low differential pressures. In the pneumatic suspension system with the inertial control unit according to FIG. 2, they will not result in valve actuation because the amplitude will not exceed the threshold dimension "A", and in a pneumatic suspension system with the pressure-responsive control units according to FIGS. 1 and 3, they will not result in valve actuation because the differential pressure will not exceed the spring force.

Vibrations within the resonance-frequency range have been dealt with earlier. They result in alternative actuation of the inlet or outlet valves in accordance with the direction of the vibrations.

Figure 4:
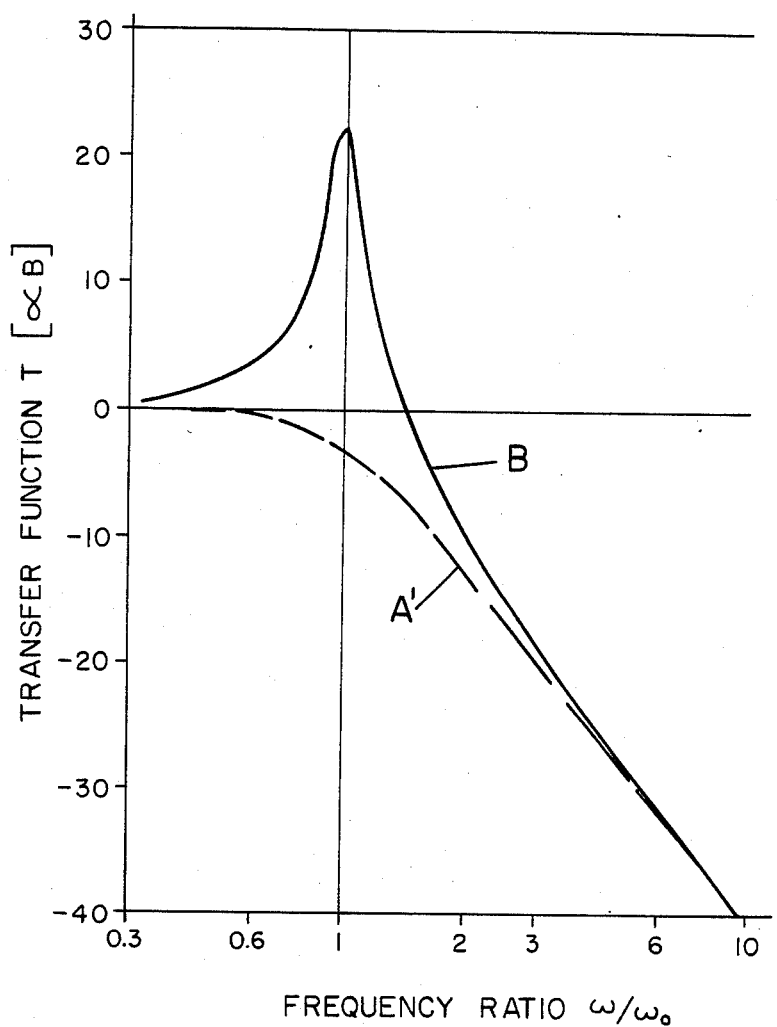
FIG. 4 is a representational nomograph of the vibration transmission function of the preferred embodiments and a conventional air spring not including the invention.

The graph of FIG. 4 compares the transmission function A' of the pneumatic suspension system of the invention with the transmission function B of a conventional design. The latter amplifies vibrations between the suspended structures in the resonance-frequency range. No such effect is produced with the invention. The transmission of low- and high-frequency vibrations is similar in both cases. It is characterized by good isolation.

It will be appreciated that the instant specification and claims are set forth by way of illustration and not of limitation, and that various modifications and changes may be made without departing from the spirit and scope of the present invention.

What is claimed is:

1. An active pneumatic suspension system for resilient and damping connection of relatively-vibratable structures, comprising:
    a housing for pneumatically suspending relatively-vibratable structures resiliently, the housing having a working chamber for containing a pressurized gas and means varying the volume of the working chamber in response to the relative vibration of the structures for the pneumatic suspension;
    inlet valve means operable for admitting pressurized gas into the working chamber;
    outlet valve means openable for venting gas from the working chamber; and
    control means responsive above respective thresholds to respective vibration of the structures toward and away from each other for opening only one of the outlet and inlet valve means, respectively, thereby to damp the vibration of the structures with the varied amount of the gas in the working chamber, the control means comprising:
    a damping chamber for having pressurized gas therein and having a throttle opening connecting it to the working chamber; and
    at least one piston suspended operatively between the gas pressures in the working and damping chambers for movement in response to a gas pressure differential between the working and damping chambers above the respective thresholds opening one of the inlet and outlet valve means.

2. The system of claim 1 wherein the housing has only the one working chamber.

3. The system of claim 2 wherein the housing comprises a pipe closed at one end, a plug at the other end of the pipe, and a diaphragm connecting the pipe and plug.

4. The system of claim 1 wherein the control means further comprises means for response to vibration-produced pressure in the working chamber.

5. The system of claim 4 wherein:
    the piston comprises first and second spacedly superposed diaphragms for defining a relief space communicating with a gas outlet therebetween, and means connected to one diaphragm for delimiting the damping chamber and to the other for forming a seat for the outlet valve means;
    the outlet valve means comprises a bevel plug cooperative with the seat in the piston; and
    the inlet valve means comprises a bevel plug cooperative with a seat in the control means at a gas inlet thereof and connected to the bevel plug of the outlet valve means,
    whereby a pressure differential in the working chamber over the damping chamber in excess of the threshold of the outlet valve means opens the same by moving the piston seat from the outlet bevel plug which is held by the connection to the inlet bevel plug seated in the control means and the opposite pressure differential in excess of the threshold of the inlet valve means unseats the bevel plug thereof with opposite movement of the piston seat.

6. The system of claim 1 wherein the control means further comprises means for inertial response.

7. The system of claim 6 wherein the control means further comprises a control-means housing for connection to a vibratable one of the structures and at least one floating piston in the control-means housing, the floating piston cooperating with the control-means housing for forming at least one of the inlet and outlet valve means.

8. The system of claim 7 wherein:
    the control-means housing comprises a valve seat slidably cooperative with the floating piston and positioned relative to the effective ends thereof and the direction of the vibration for forming one of the inlet and outlet valve means, means sealingly connecting the housing to the floating piston for defining a path between the valve seat and one of a gas inlet and outlet respectively for the one of the inlet and outlet valve means; and
    the floating piston comprises two pistons respectively for the inlet and outlet valve means and means for resiliently connecting the pistons to the control-means housing at least at one end thereof in the direction of the vibrations, the end of each piston cooperative with the valve seat therefor overlapping the latter by a distance defining the threshold of the control means.

9. The system of claim 3 wherein the control means further comprises a control-means housing for connection to a vibratable one of the structures and at least one floating piston in the control-means housing, the floating piston cooperating with the control-means housing for forming at least one of the inlet and outlet valve means.

10. The system of claim 1, and further comprising:
pressure controller means for controlling the pressure of the gas admitted into the working chamber by the inlet valve means relative to the pressure in the working chamber.

11. The system of claim 4, and further comprising:
pressure controller means for controlling the pressure of the gas admitted into the working chamber by the inlet valve means relative to the pressure in the working chamber.

12. The system of claim 6, and further comprising:
pressure controller means for controlling the pressure of the gas admitted into the working chamber by the inlet valve means relative to the pressure in the working chamber.

13. The system of claim 10 wherein the pressure controller means comprises supply means for supplying the pressurized gas at a pressure; and a control chamber communicating with the working chamber through a throttle opening and means responsive at a pressure reduction ratio to the gas pressure in the control chamber through the throttle opening relative to the pressure of the supply means.

14. The system of claim 13 wherein the pressure reduction ratio of the means responsive to the gas pressure is from about 0.1 to about 0.9.

15. The system of claim 13 wherein the pressure reduction ratio of the means responsive to the gas pressure is from about 0.3 to about 0.8.

16. The system of claim 13 wherein the pressure reduction ratio of the means responsive to the gas pressure is about 0.5.

* * * * *